(12) United States Patent
Barker et al.

(10) Patent No.: US 11,015,473 B2
(45) Date of Patent: May 25, 2021

(54) CARRIER FOR BLADE OUTER AIR SEAL

(71) Applicant: United Technologies Corporation, Farmington, CT (US)

(72) Inventors: William M. Barker, North Andover, MA (US); Thomas E. Clark, Sanford, ME (US); Craig R. McGarrah, Southington, CT (US); Daniel J. Whitney, Topsham, ME (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 161 days.

(21) Appl. No.: 16/356,111

(22) Filed: Mar. 18, 2019

(65) Prior Publication Data

US 2020/0300108 A1 Sep. 24, 2020

(51) Int. Cl.
*F01D 11/08* (2006.01)

(52) U.S. Cl.
CPC .......... *F01D 11/08* (2013.01); *F05D 2240/55* (2013.01); *F05D 2260/30* (2013.01); *F05D 2300/6033* (2013.01)

(58) Field of Classification Search
None
See application file for complete search history.

(56) References Cited

U.S. PATENT DOCUMENTS

| 5,609,469 | A  | * | 3/1997  | Worley ............... | F01D 11/005 |
|---|---|---|---|---|---|
|  |  |  |  |  | 415/173.1 |
| 6,170,831 | B1 | * | 1/2001  | Bouchard ........... | F01D 11/005 |
|  |  |  |  |  | 277/355 |
| 8,568,091 | B2 |   | 10/2013 | McCaffrey |  |
| 9,353,649 | B2 | * | 5/2016  | Rioux ................. | F01D 9/042 |
| 9,879,557 | B2 | * | 1/2018  | Hall .................... | F01D 11/005 |
| 10,087,784 | B2 | * | 10/2018 | Shapiro ............... | F01D 25/005 |
| 10,138,750 | B2 |   | 11/2018 | McCaffrey et al. |  |
| 2009/0096174 | A1 | * | 4/2009  | Spangler ............. | F01D 11/08 |
|  |  |  |  |  | 277/345 |
| 2014/0241874 | A1 | * | 8/2014  | Rioux ................. | F01D 25/246 |
|  |  |  |  |  | 415/209.4 |
| 2016/0003103 | A1 | * | 1/2016  | Shapiro ............... | F01D 25/246 |
|  |  |  |  |  | 416/185 |
| 2016/0047258 | A1 | * | 2/2016  | Hall .................... | F01D 11/005 |
|  |  |  |  |  | 415/1 |
| 2020/0003066 | A1 | * | 1/2020  | Clark .................. | F01D 11/08 |
| 2020/0003077 | A1 | * | 1/2020  | Clark .................. | F01D 11/08 |

* cited by examiner

*Primary Examiner* — Eldon T Brockman
(74) *Attorney, Agent, or Firm* — Carlson, Gaskey & Olds, P.C.

(57) ABSTRACT

A blade outer air seal assembly includes a seal segment that has a base portion that extends between a first circumferential side and a second circumferential side and from a first axial side to a second axial side. A first wall is axially spaced from a second wall. The first and second walls extend from the base portion to an outer wall to define a circumferentially extending seal passage. A carrier has a platform. A portion of the platform is within the seal passage. A radially extending first hook protrudes from the platform and is configured to engage with a support structure.

20 Claims, 7 Drawing Sheets

CARRIER FOR BLADE OUTER AIR SEAL

BACKGROUND

This application relates to a ceramic matrix composite blade outer air seal assembly.

Gas turbine engines are known and typically include a compressor compressing air and delivering it into a combustor. The air is mixed with fuel in the combustor and ignited. Products of the combustion pass downstream over turbine rotors, driving them to rotate.

It is desirable to ensure that the bulk of the products of combustion pass over turbine blades on the turbine rotor. As such, it is known to provide blade outer air seals radially outwardly of the blades. Blade outer air seals have been proposed made of ceramic matrix composite fiber layers.

SUMMARY

In one exemplary embodiment, a blade outer air seal assembly includes a seal segment that has a base portion that extends between a first circumferential side and a second circumferential side and from a first axial side to a second axial side. A first wall is axially spaced from a second wall. The first and second walls extend from the base portion to an outer wall to define a circumferentially extending seal passage. A carrier has a platform. A portion of the platform is within the seal passage. A radially extending first hook protrudes from the platform and is configured to engage with a support structure.

In a further embodiment of the above, the first hook extends generally in a first axial direction.

In a further embodiment of any of the above, a second hook protrudes from the platform. The first and second hooks extending generally in a first axial direction.

In a further embodiment of any of the above, the first hook is near a leading edge of the carrier and the second hook is near a trailing edge of the carrier.

In a further embodiment of any of the above, a support structure has a hook protruding radially inward and in engagement with the first hook.

In a further embodiment of any of the above, a post extends radially outward from the platform and engages with an edge of the outer wall.

In a further embodiment of any of the above, the post is arranged circumferentially outward of the first hook.

In a further embodiment of any of the above, a second hook protrudes from the base portion and the post is arranged axially between the first and second hooks.

In a further embodiment of any of the above, a hole extends through the platform.

In a further embodiment of any of the above, a wear liner is arranged between the carrier and the seal segment.

In a further embodiment of any of the above, a brush seal is arranged at the first axial side of the seal segment.

In a further embodiment of any of the above, a featherseal is arranged at the first circumferential side of the seal segment.

In a further embodiment of any of the above, the carrier is a metallic material.

In a further embodiment of any of the above, the blade outer air seal is a ceramic matrix composite material.

In another exemplary embodiment, a turbine section for a gas turbine engine includes a turbine blade that extends radially outwardly to a radially outer tip and for rotation about an axis of rotation. A blade outer air seal has a plurality of segments mounted in a support structure via a carrier. The plurality of segments are arranged circumferentially about the axis of rotation and radially outward of the outer tip. Each seal segment has a base portion that extends between a first circumferential side and a second circumferential side and from a first axial side to a second axial side. A first wall is axially spaced from a second wall. The first and second walls extend from the base portion to an outer wall to define a circumferentially extending seal passage. The carrier has a platform. A portion of the platform is within the seal passage. A radially extending first hook protrudes from the platform and is engaged with the support structure.

In a further embodiment of any of the above, a second hook protrudes from the platform. The first and second hooks extend generally in a first axial direction.

In a further embodiment of any of the above, a post extends radially outward from the platform and engages with an edge of the outer wall.

In a further embodiment of any of the above, a wear liner is arranged between the seal segment and the carrier.

In a further embodiment of any of the above, the seal segment is a ceramic matrix composite material.

In a further embodiment of any of the above, the carrier is a metallic material.

These and other features may be best understood from the following drawings and specification.

DETAILED DESCRIPTION

Figure 1:
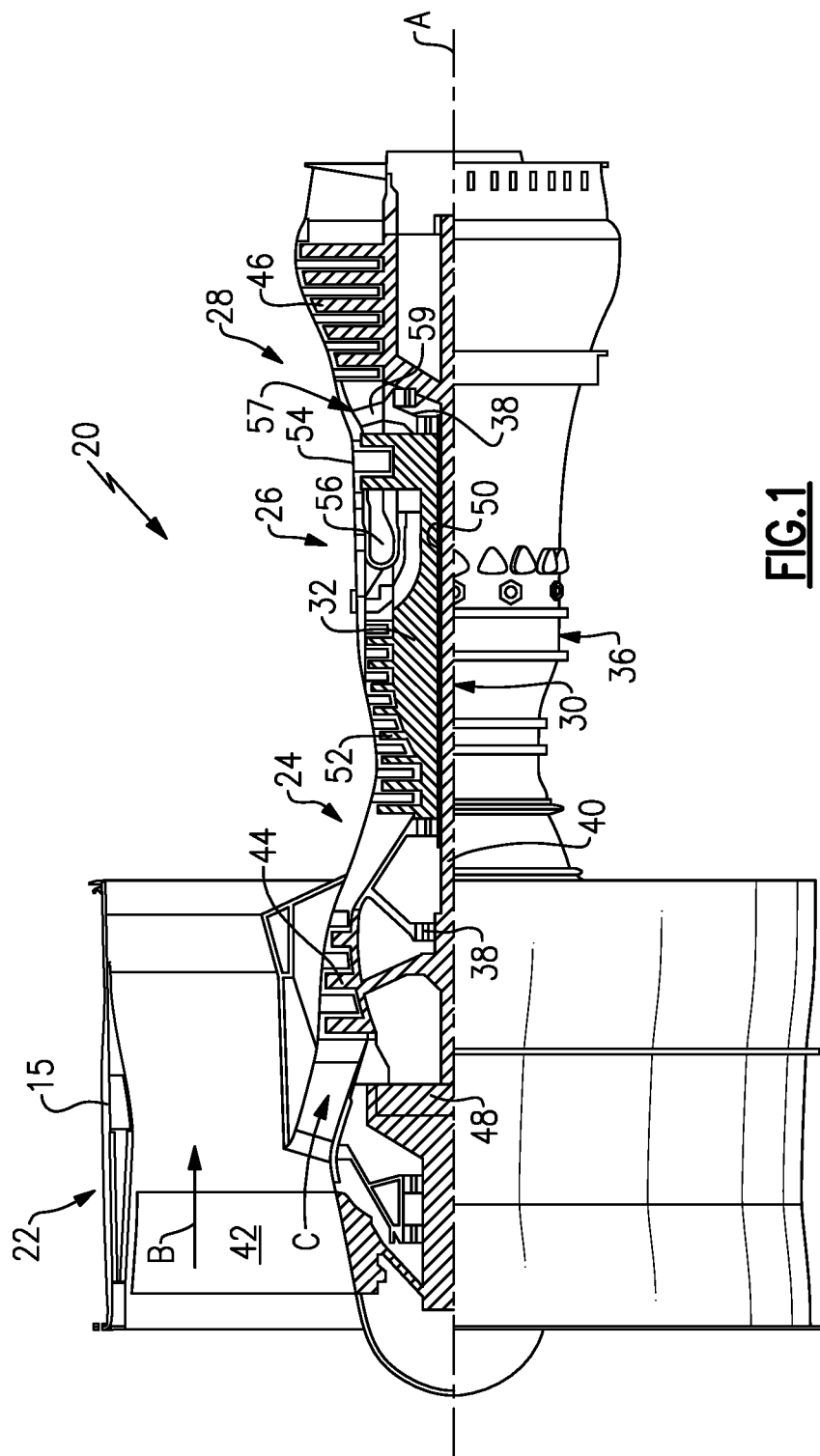
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine engine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2:
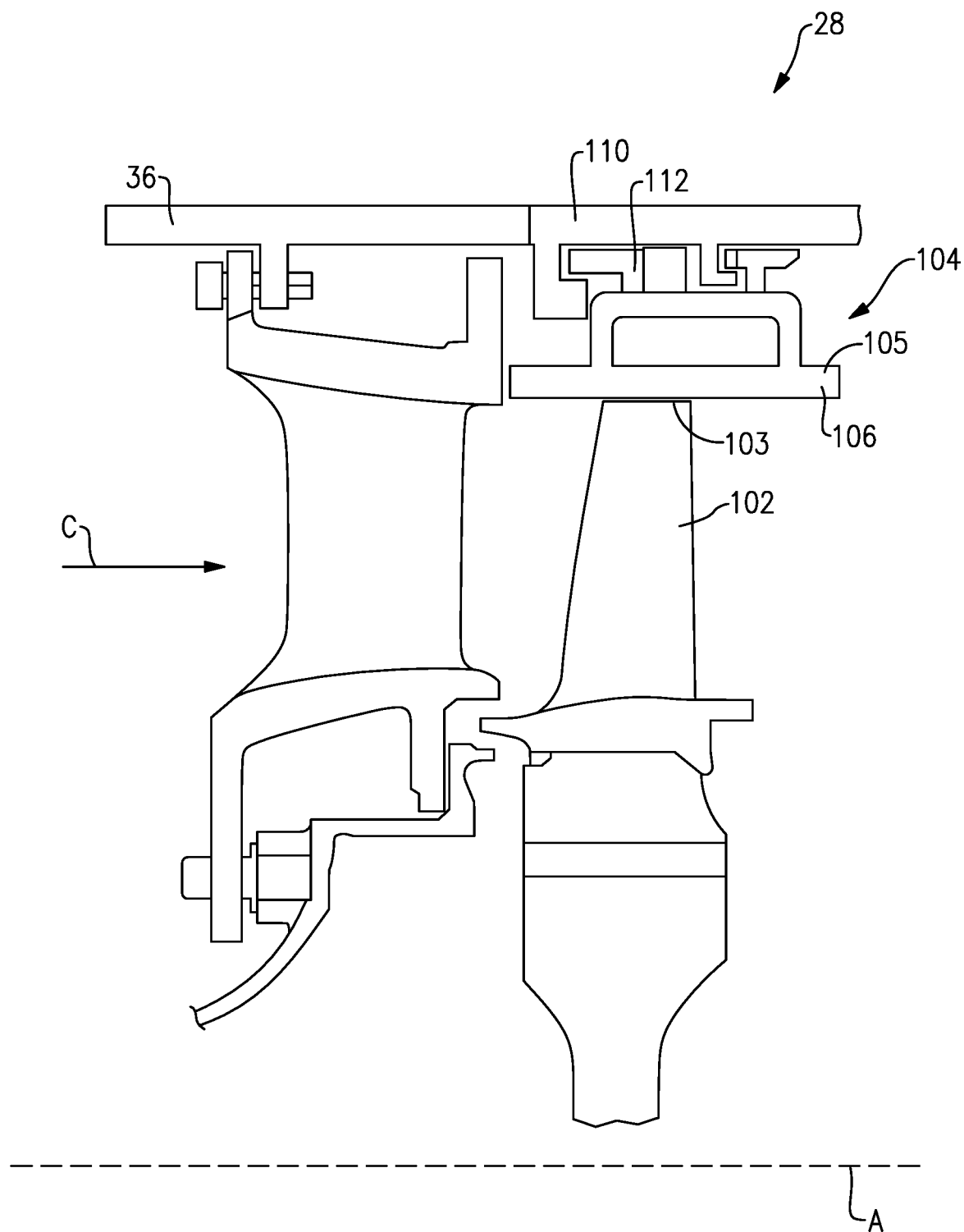
FIG. 2 shows an example turbine section.

FIG. 2 shows a portion of an example turbine section 28, which may be incorporated into a gas turbine engine such as the one shown in FIG. 1. However, it should be understood that other sections of the gas turbine engine 20 or other gas turbine engines, and even gas turbine engines not having a fan section at all, could benefit from this disclosure.

A turbine blade 102 has a radially outer tip 103 that is spaced from a blade outer air seal assembly 104 with a blade outer air seal ("BOAS") 106. The BOAS 106 may be made up of a plurality of seal segments 105 that are circumferentially arranged in an annulus about the central axis A of the engine 20. The BOAS segments 105 may be monolithic bodies that are formed of a high thermal-resistance, low-toughness material, such as a ceramic matrix composite ("CMC").

The BOAS 106 may be mounted to an engine case or structure, such as engine static structure 36 via a control ring or support structure 110 a carrier 112. The engine structure 36 may extend for a full 360° about the engine axis A. The engine structure 36 may support the support structure 110 via a hook or other attachment means. The engine case or support structure holds the BOAS 106 radially outward of the turbine blades 102.

Figure 3:
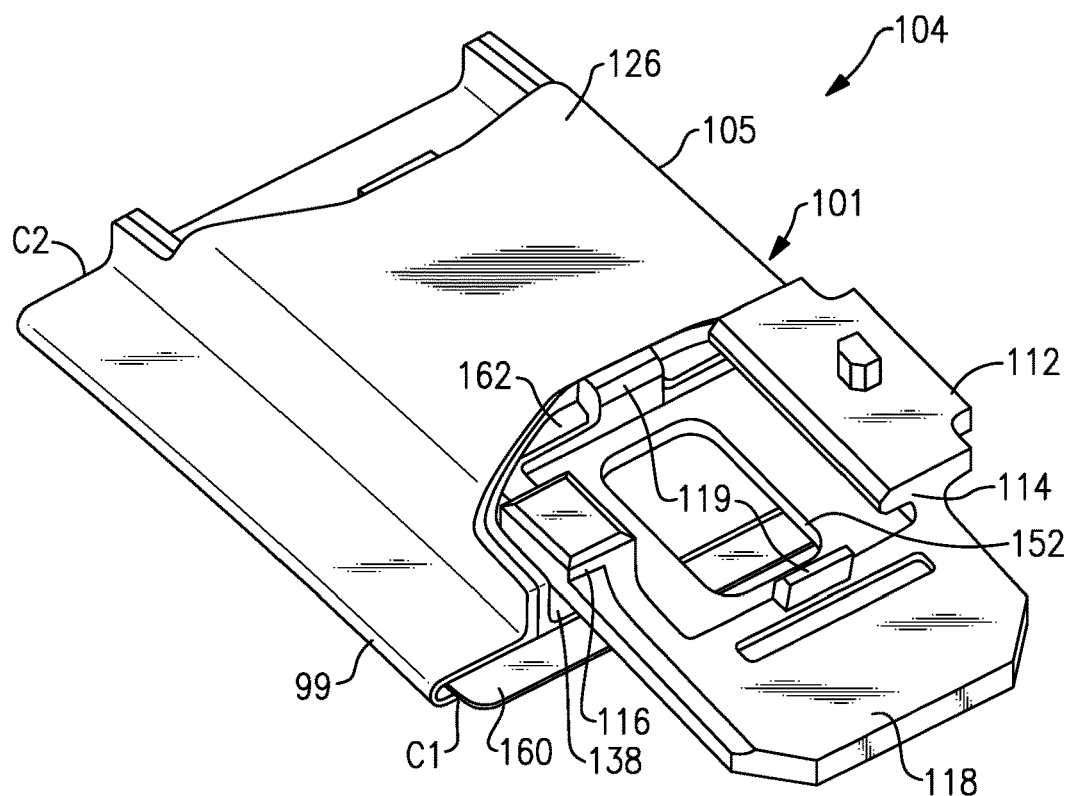
FIG. 3 shows a portion of an exemplary blade outer air seal assembly.

FIG. 3 shows a portion of an example BOAS assembly 104. The assembly 104 has a seal segment 105 with a carrier 112. The carrier 112 may be segmented, with each segment arranged between adjacent seal segments 105. The carrier 112 has a platform 118 that is configured to engage with the seal segment 105. In this example, an end of the base portion 118 fits within a passage 138 of the seal segment 105. The carrier 112 has first and second hooks 114, 116 that extend radially outward from the base portion 118 for attaching the carrier 112 and seal segment 105 to the support structure 110. The carrier 112 may have posts 119 that engage with an edge of the seal segment 105, and help prevent rotation of the seal segment 105 relative to the carrier 112. In one example, the posts 119 are circumferentially outward of the first and second hooks 114, 116. The posts 119 may be located axially between the hooks 114, 116. In some examples, the posts 119 are centered on the platform 118 in the axial direction. The posts 119 may extend in the radial direction such that a top of the posts 119 is approximately flush with the outer wall 126 of the seal segment 105.

A wear liner 162 may be arranged between the seal segment 105 and the carrier 112 in some examples. A feather seal 160 may be used for sealing between circumferential ends C1, C2 of adjacent seal segments 105. The feather seal 160 may extend along the axial length of the BOAS segment 105.

Figure 4:
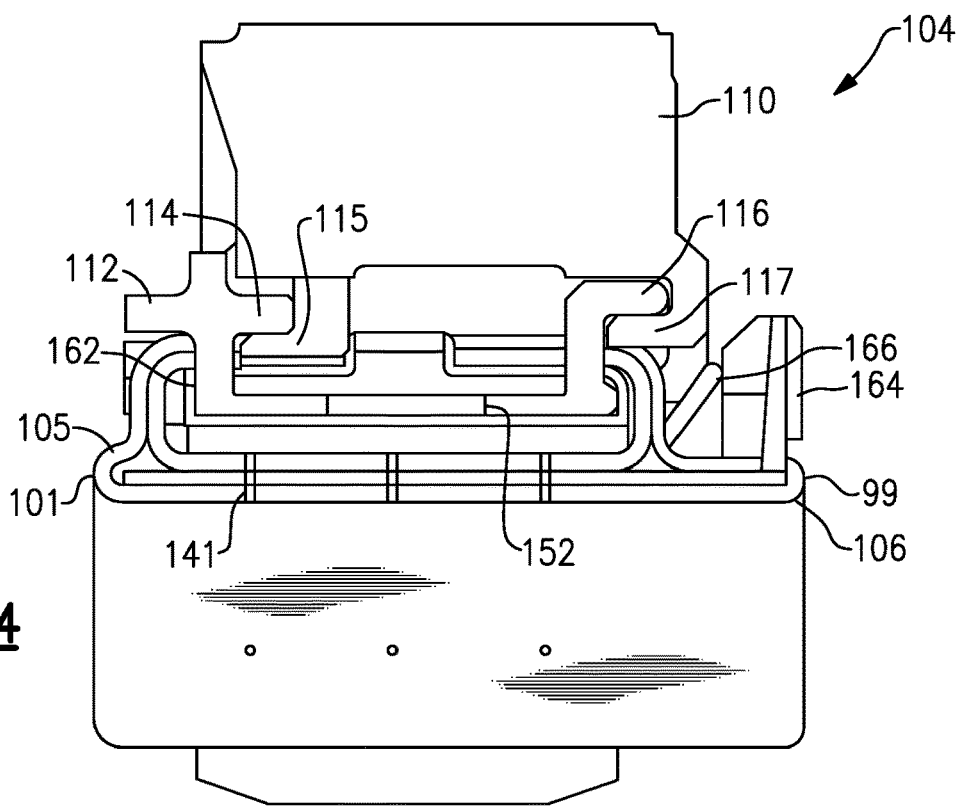
FIG. 4 shows a cross section of the exemplary blade outer air seal assembly.

FIG. 4 shows the BOAS assembly 104 with the support structure 110. The support structure 110 has first and second hooks 115, 117 that extend radially inward and are configured to engage with the first and second hooks 114, 116 of the carrier 112. In the illustrated embodiment, the hooks 114, 116 of the carrier 112 extend generally axially forward towards the leading edge 99, while the hooks 115, 117 extend generally axially backwards towards the trailing edge 101. However, the hooks 114, 116, 115, 117 may have different orientations, such as extending in the opposite direction, so long as the hooks 114, 116 of the carrier engage with the hooks 115, 117 of the support structure 110.

The carrier 112 may have a hole 152 extending radially through the platform 118. The hole 152 may be between the hooks 114, 116. The hole 152 may permit cooling air to flow through the platform 118 and may provide weight reduction of the carrier 112. Although a single, generally rectangular hole 152 is shown, the platform 118 may more holes 152 and/or differently shaped holes 152.

The assembly 104 may include a front brush seal 164 and a diamond or dogbone seal 166 in some examples. These seals 164, 166 are engaged with the leading edge 99 of the BOAS 106, and help maintain the axial position of the BOAS 106. The dogbone seal 166 may bias the BOAS 106 axially against the carrier 112.

Figure 5:
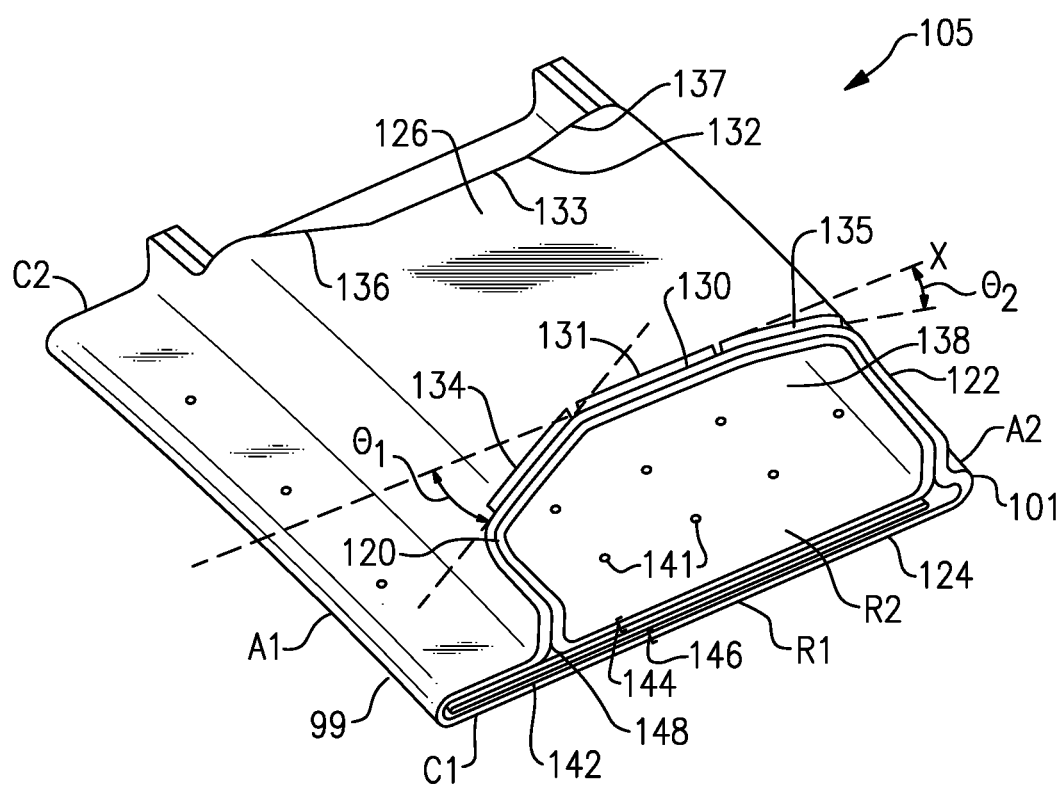
FIG. 5 shows an exemplary blade outer air seal.

FIG. 5 illustrates an exemplary BOAS segment 105. The seal segment 105 is a body that defines radially inner and outer sides R1, R2, respectively, first and second axial sides A1, A2, respectively, and first and second circumferential sides C1, C2, respectively. The radially inner side R1 faces in a direction toward the engine central axis A. The radially inner side R1 is thus the gas path side of the seal segment 105 that bounds a portion of the core flow path C. The first axial side A1 faces in a forward direction toward the front of the engine 20 (i.e., toward the fan 42), and the second axial side A2 faces in an aft direction toward the rear of the engine 20 (i.e., toward the exhaust end). That is, the first axial side A1 corresponds to a leading edge 99, and the second axial side A2 corresponds to a trailing edge 101.

In the illustrated example, the BOAS segment 105 includes a first axial wall 120 and a second axial wall 122 that extend radially outward from a base portion 124. The first and second axial walls 120, 122 are axially spaced from one another. Each of the first and second axial walls 120, 122 extends along the base portion 124 in a generally circumferential direction along at least a portion of the seal segment 105. The base portion 124 extends between the leading edge 99 and the trailing edge 101 and defines a gas path on a radially inner side and a non-gas path on a radially outer side. An outer wall 126 extends between the first and second axial walls 120, 122. The outer wall 126 includes a generally constant thickness and constant position in the radial direction. The base portion 124, first and second axial walls 120, 122, and the outer wall 126 form a passage 138 that extends in a generally circumferential direction. In this disclosure, forward, aft, upstream, downstream, axial, radial, or circumferential is in relation to the engine axis A unless stated otherwise. The base portion 124 may extend axially forward and aft of the first and second walls 120, 122, and provides a flat surface for sealing of the BOAS leading and trailing edges 99, 101. For example, the base portion 124 includes a portion axially forward of the first axial wall 120 for engagement with seals 164, 166 (shown in FIG. 4).

The outer wall 126 has first and second edges 130, 132. The edges 130, 132 have tapered portions. A first portion 131, 133 of the edges 130, 132, respectively, extends generally in the axial direction X. The first portions 131, 133 provide a flat face for engagement with the carrier 112, and help prevent rotation of the seal segment 105 relative to the carrier 112. Tapered portions upstream and downstream of the first portion 131, 133 are angled relative to the axial direction. A second portion 134, 136 of the edges 130, 132, respectively, is upstream of the first portions 131, 133. The second portions 134, 136 are arranged at a first angle $\theta_1$ with respect to the first portions 131, 133. A third portion 135, 137 of the edges 130, 132, respectively, is downstream of the first portions 131, 133. The third portions 135, 137 are arranged at a second angle $\theta_2$ with respect to the first portions 131, 133. The second and third portions 134, 136, 135, 137 provide tapered faces, which may reduce stresses on the seal segment 105. The first and second angles $\theta_1$, $\theta_2$ may be the same, or different from one another. In one example embodiment, the first and second angles $\theta_1$, $\theta_2$ are less than about 45° with respect to the axial direction X. In another embodiment, the first and second angles $\theta_1$, $\theta_2$ are less than about 20° with respect to the axial direction X. The first angle $\theta_1$ may be greater than the second angle $\theta_2$. In one example, the first angle $\theta_1$ is about 20° and the second angle $\theta_2$ is about 10°.

In the illustrated embodiment, the first portion 131, 133 is generally centered on the outer wall 126. However, in other embodiments, the first portion 131, 133 may be moved axially forward or aft, depending on the carrier 112 and wear liner 162 to address varying torque loads. In one example embodiment, the first portion 131, 133 has a length in the axial direction of about 0.30 inches (7.62 mm). The axial length of the first portion 131, 133 provides a surface for mating with the carrier 112.

The BOAS 106 may be formed of a ceramic matrix composite ("CMC") material. Each seal segment 105 is formed of a plurality of CMC laminates 142. The laminates may be silicon carbide fibers, formed into a braided or woven fabric in each layer. The fibers may be coated by a boron nitride. In other examples, the BOAS 106 may be made of a monolithic ceramic.

CMC components such as BOAS segments 105 are formed by laying fiber material, such as laminate sheets, in tooling, injecting a liquid resin into the tooling, and curing to form a solid composite component. The component may be densified by adding additional material to further stiffen the laminates.

In an embodiment, the BOAS segment 105 is formed from two loops of CMC laminated plies. A first loop 144 comprises the inner-most layers relative to the respective passage 138. A second loop 146 is formed about the first loop 144 to form the outermost layers relative to the passage 138. In one example embodiment, the first and second loops 144, 146 are each formed from four laminated plies 142. In some examples, the base portion 124 includes reinforcement plies 148 between the first and second loops 144, 146.

In an example embodiment, the BOAS segment 105 has a constant wall thickness of about 8 or 9 laminated plies, with each plie having a thickness of about 0.011 inches (0.279 mm). This structure may reduce thermal gradient stress. In other embodiments, the BOAS may be constructed of more or fewer plies. In one example, the first and second loops 144, 146 are formed from laminates wrapped around a core mandrel. In some embodiments, after the laminate plies 142 are formed into a seal segment 105, additional features, such as edges 130, 132 are machined in to form mating surfaces and/or cooling holes. The seal segment 105 may be ultrasonically machined, for example.

Figure 6:
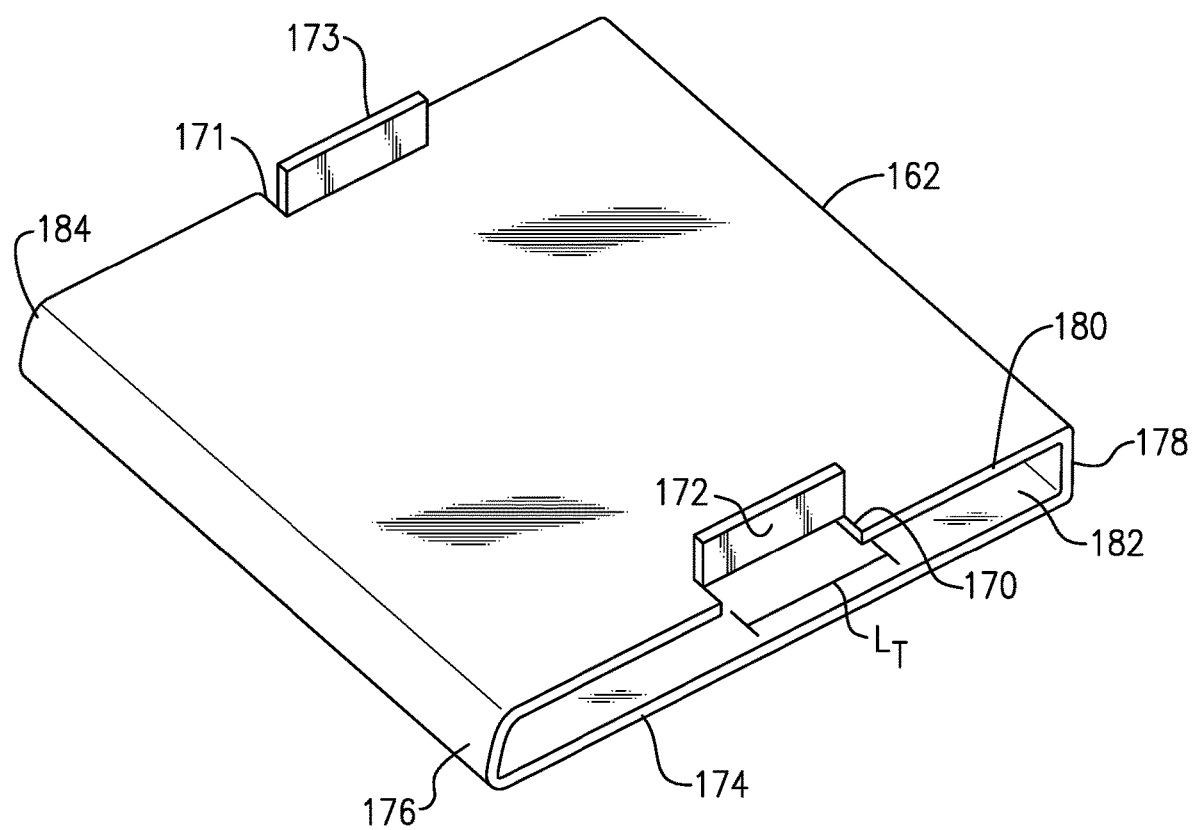
FIG. 6 shows an exemplary wear liner for a blade outer air seal.

FIG. 6 shows an example wear liner 162. The wear liner 162 is configured to fit within the passage 138 of the seal segment 105. The wear liner 162 contacts the carrier 112 instead of the seal segment 105 to reduce wear on the seal segment 105. The wear liner 162 generally has a base portion 174, first and second wall portions 176, 178, and an outer portion 180 that form a passage 182. The wear liner 162 has generally radially extending tabs 172, 173. The tabs 172, 173 may be formed from cuts 170, 171 made in the outer portion 180. The tabs 172, 173 have a length L in the axial direction. The length L is less than an axial length of the first portion 131, 133 of the seal segment edge 130, 132. In the illustrated example, the leading edge portion has a chamfer 184 to accommodate the shape of the seal segment 105 and carrier 112. The wear liner 162 may be formed from sheet metal, for example.

Figure 7:
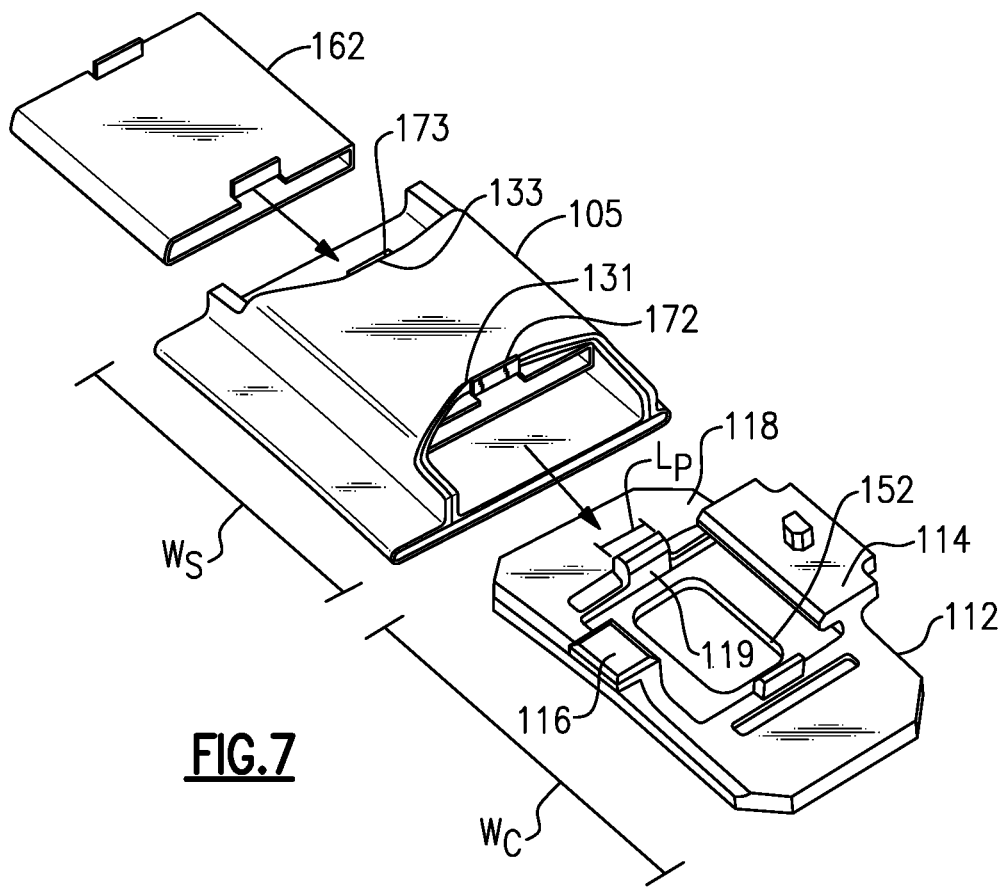
FIG. 7 shows a method step of assembling a blade outer air seal assembly.

FIG. 7 shows a method step of assembling a BOAS assembly 104. The wear liner 162 is inserted into the passage 138 of the seal segment 105. The wear liner 162 is arranged such that the tabs 172, 173 abut edges 131, 133 of the outer wall 126. Then, the seal segment 105 with the wear liner 162 are put onto the carrier 112. An end portion of the platform 118 of the carrier 112 is inserted into the liner passage 182. In an embodiment, the carrier 112 is inserted into the passage 138 until the post 119 contacts the edge portion 131 of the wear liner 162. Once the seal segments 105 and carrier 112 are assembled, these parts can be axially mounted onto the support structure 110. In one example, the seal segment 105 has a width $W_S$ in the circumferential direction and the carrier 112 has a width $W_C$ in the circumferential direction. The carrier width $W_C$ may be about the same as the seal segment width $W_S$, such that the platform 118 extends about halfway into each of two adjacent seal segments 105. In other embodiments, the carrier width $W_C$ is slightly smaller than the seal segment width $W_S$.

Figure 8:
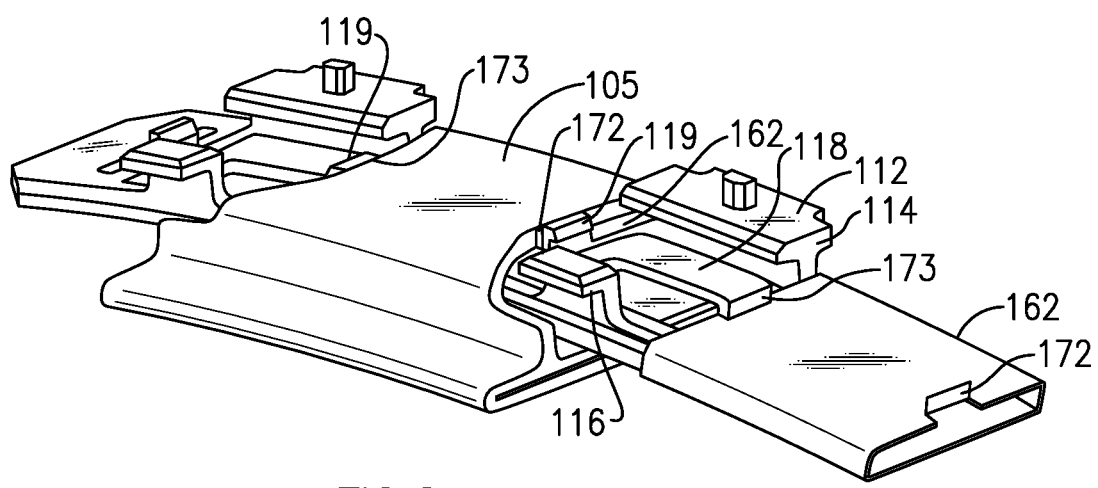
FIG. 8 shows a portion of the blade outer air seal assembly.

FIG. 8 shows a BOAS assembly 104. The carrier 112 is inserted into two liners 162 arranged within adjacent seal segments 105. The post 119 of the carrier 112 abuts the tab 172 of the liner 162. The liner 162 is thus arranged between the seal segment 105 and the carrier 112.

Figure 9:
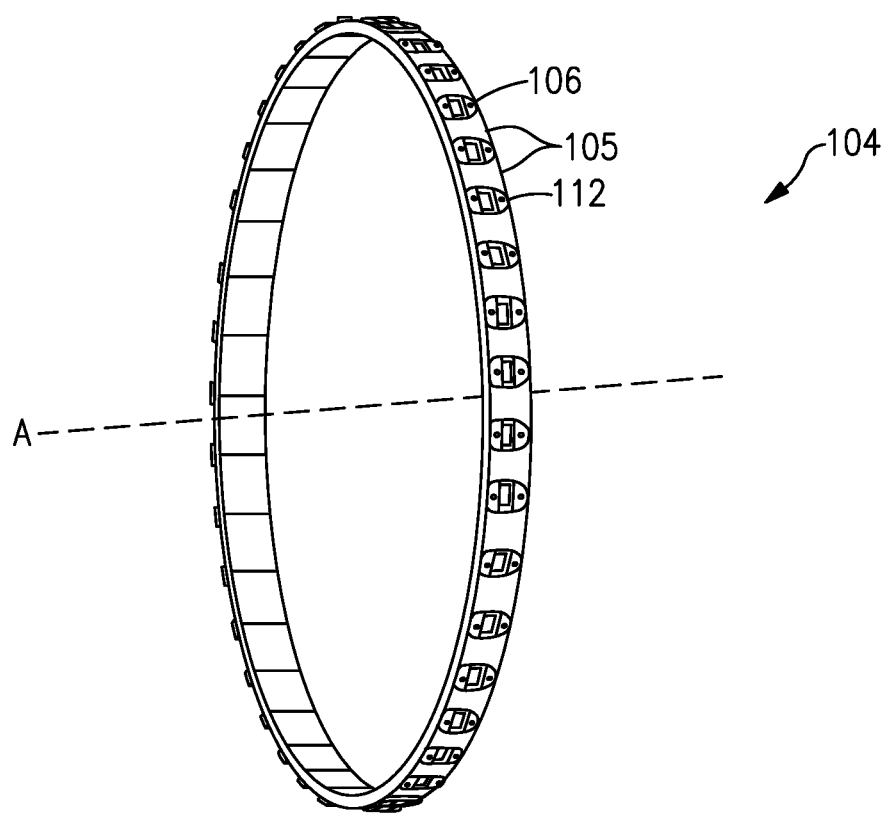
FIG. 9 shows a blade outer air seal assembly.

FIG. 9 shows a BOAS assembly 104. The assembly 104 includes a plurality of seal segments 105 and a plurality of carrier segments 112 arranged in an annulus about the engine axis A. There are an equal number of carrier segments 112 as seal segments 105. In the illustrated example, there are 40 seal segments and 40 carrier segments. However, more or fewer segments may be used.

The disclosed arrangement of the carrier 112, support structure 110, and seal segment 105 may improve BOAS carrier stability, while reducing stress on the seal segment 105. This arrangement may be particularly beneficial for CMC BOAS segments 105. CMC materials are hard, and may thus wear other surrounding structures more quickly. CMC is also relatively brittle, and may thus require protection against point loads. The disclosed carrier has a platform that allows for load distribution across the seal segment 105. The carrier arrangement also permits axial assembly of the entire BOAS assembly. The carrier 112 and support structure 110 permit the use of a ceramic BOAS, which is not as ductile as metallic materials. The ability to use ceramic BOAS promotes a more stable assembly.

In this disclosure, "generally axially" means a direction having a vector component in the axial direction that is greater than a vector component in the circumferential direction, "generally radially" means a direction having a vector component in the radial direction that is greater than a vector component in the axial direction and "generally circumferentially" means a direction having a vector component in the circumferential direction that is greater than a vector component in the axial direction.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A blade outer air seal assembly, comprising:
a seal segment having a base portion extending between a first circumferential side and a second circumferential side and from a first axial side to a second axial side, a first wall axially spaced from a second wall, the first and second walls extending from the base portion to an outer wall to define a circumferentially extending seal passage; and
a carrier having a platform, wherein a portion of the platform is within the seal passage, and wherein a radially extending first hook protrudes from the platform and is configured to engage with a support structure, wherein a post extends radially outward from the platform and engages with an edge of the outer wall, the post arranged circumferentially outward of the first hook.

2. The assembly of claim 1, wherein the first hook extends generally in a first axial direction.

3. The assembly of claim 1, wherein a second hook protrudes from the platform, the first and second hooks extending generally in a first axial direction.

4. The assembly of claim 3, wherein the first hook is near a leading edge of the carrier and the second hook is near a trailing edge of the carrier.

5. The assembly of claim 1, comprising a support structure having a hook protruding radially inward and in engagement with the first hook.

6. The assembly of claim 1, wherein a second hook protrudes from the base portion and the post is arranged axially between the first and second hooks.

7. The assembly of claim 1, wherein a hole extends through the platform.

8. The assembly of claim 1, wherein a wear liner is arranged between the carrier and the seal segment.

9. The assembly of claim 1, wherein a brush seal is arranged at the first axial side of the seal segment.

10. The assembly of claim 1, wherein a featherseal is arranged at the first circumferential side of the seal segment.

11. The assembly of claim 1, wherein the carrier is a metallic material.

12. The assembly of claim 1, wherein the blade outer air seal is a ceramic matrix composite material.

13. The assembly of claim 1, wherein the post is centered on the platform in the axial direction.

14. The assembly of claim 1, wherein the post extends in a radial direction such that a top of the post is substantially flush with the outer wall.

15. The assembly of claim 1, wherein the platform has a carrier width in a circumferential direction, and the first hook as a width in the circumferential direction that is smaller than the carrier width.

16. A turbine section for a gas turbine engine, comprising:
a turbine blade extending radially outwardly to a radially outer tip and for rotation about an axis of rotation;
a blade outer air seal having a plurality of segments mounted in a support structure via a carrier, the plurality of segments arranged circumferentially about the axis of rotation and radially outward of the outer tip;
each seal segment having a base portion extending between a first circumferential side and a second circumferential side and from a first axial side to a second axial side, a first wall axially spaced from a second wall, the first and second walls extending from the base portion to an outer wall to define a circumferentially extending seal passage;

wherein the carrier has a platform, wherein a portion of the platform is within the seal passage, and wherein a radially extending first hook protrudes from the platform and is engaged with the support structure, wherein a post extends radially outward from the platform and engages with an edge of the outer wall, the post arranged circumferentially outward of the first hook.

17. The turbine section of claim 16, wherein a second hook protrudes from the platform, the first and second hooks extending generally in a first axial direction.

18. The turbine section of claim 16, wherein a wear liner is arranged between the seal segment and the carrier.

19. The turbine section of claim 16, wherein the seal segment is a ceramic matrix composite material.

20. The turbine section of claim 16, wherein the carrier is a metallic material.

* * * * *